United States Patent [19]

Udall

[11] 4,277,871
[45] Jul. 14, 1981

[54] HEAT EXCHANGER PANELS AND METHOD OF MANUFACTURE

[75] Inventor: Humfrey N. Udall, Darien, Conn.

[73] Assignee: Thermatool Corp., Stamford, Conn.

[21] Appl. No.: 113,796

[22] Filed: Jan. 21, 1980

[51] Int. Cl.³ .............................................. B23P 15/26
[52] U.S. Cl. ...................... 29/157.3 C; 29/DIG. 48; 29/157.3 A; 113/118 C; 113/118 A; 165/182
[58] Field of Search ................... 29/157.3 C, 157.3 B, 29/157.3 A, DIG. 48; 113/118 A, 118 B, 118 C; 165/182, 171

[56] References Cited

U.S. PATENT DOCUMENTS 4,136,272  1/1979  Rudd .............................. 29/157.3 C

FOREIGN PATENT DOCUMENTS 609909  12/1960  Canada .............................. 29/157.3 C

*Primary Examiner*—Nicholas P. Godici
*Assistant Examiner*—V. Rising
*Attorney, Agent, or Firm*—Brooks, Haidt, Haffner & Delahunty

[57] ABSTRACT

Method and apparatus for manufacturing a heat exchanger element which comprises a metal tube secured to a metal sheet by metal which has been heated and cooled. Wrinkles in the sheet after the tube has been joined thereto are removed by stretching at least the tube by an amount sufficient to cause the length of the tube to be substantially equal to the length of the outboard edges of the tube. The sheet may also be stretched beyond its elastic limit at the time that the tube is stretched but should not be stretched more than 2.5%.

5 Claims, 7 Drawing Figures

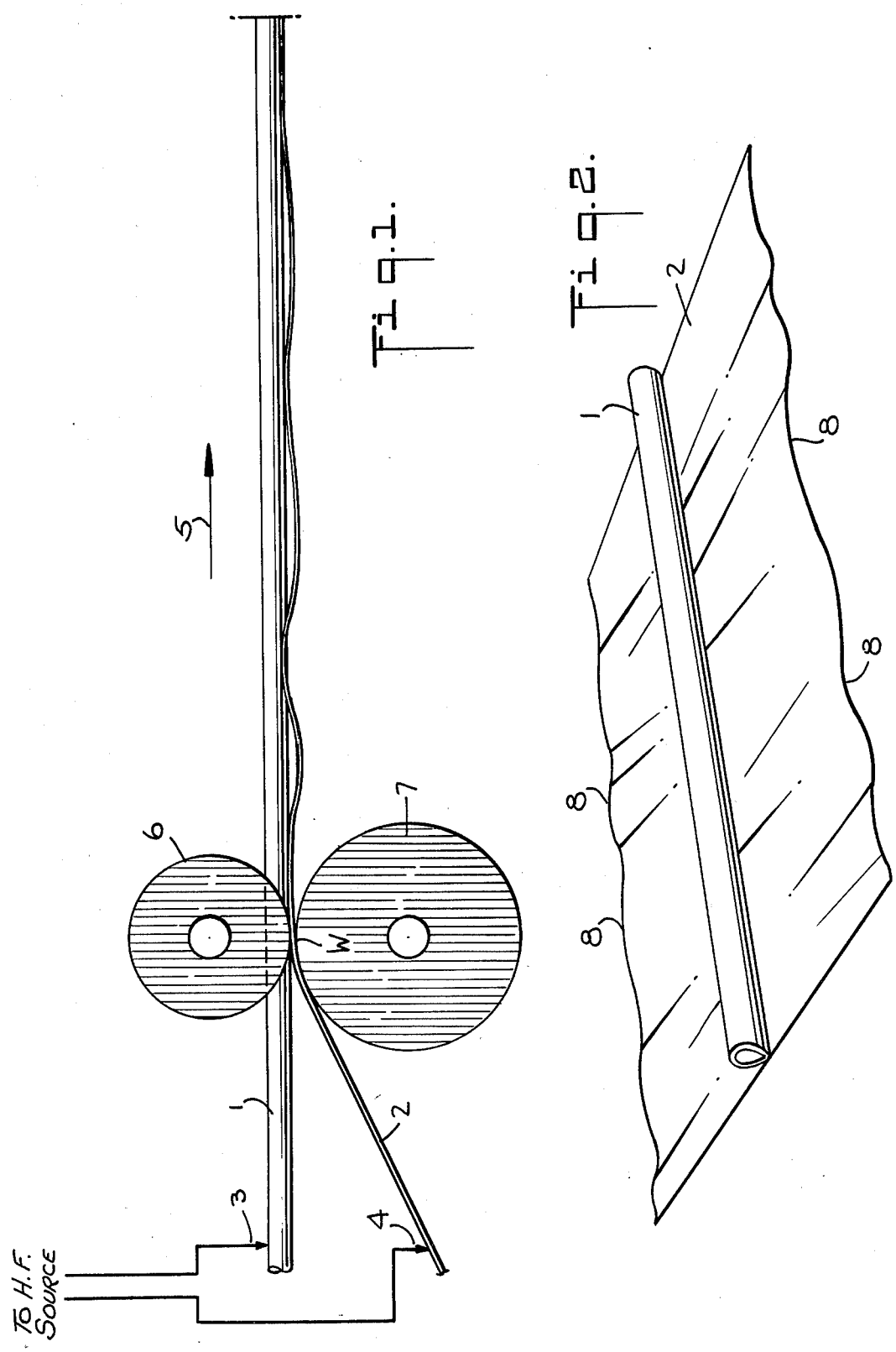

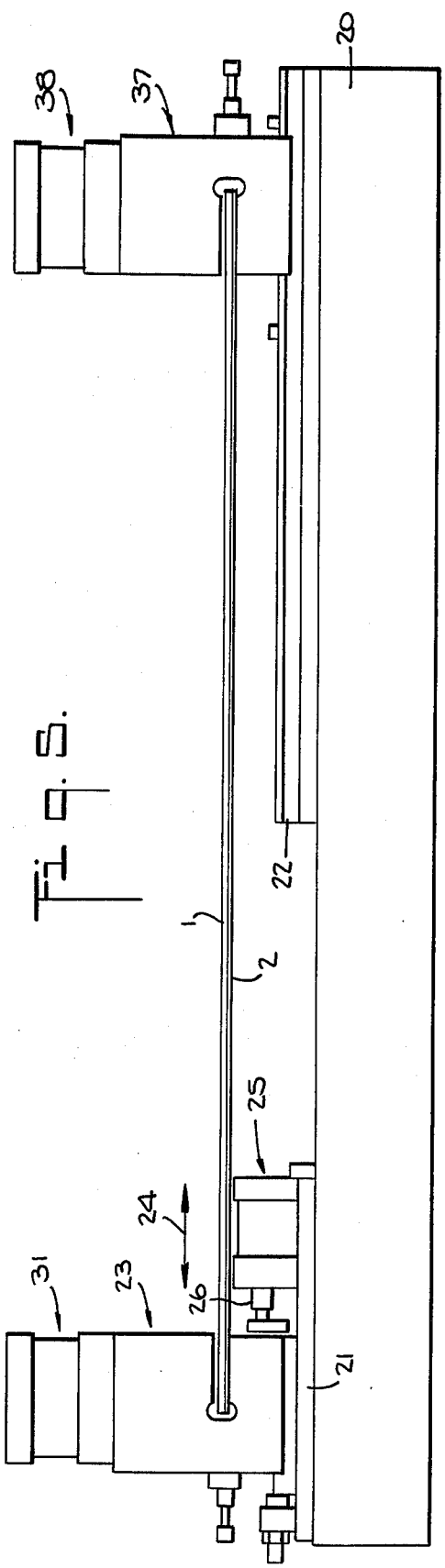
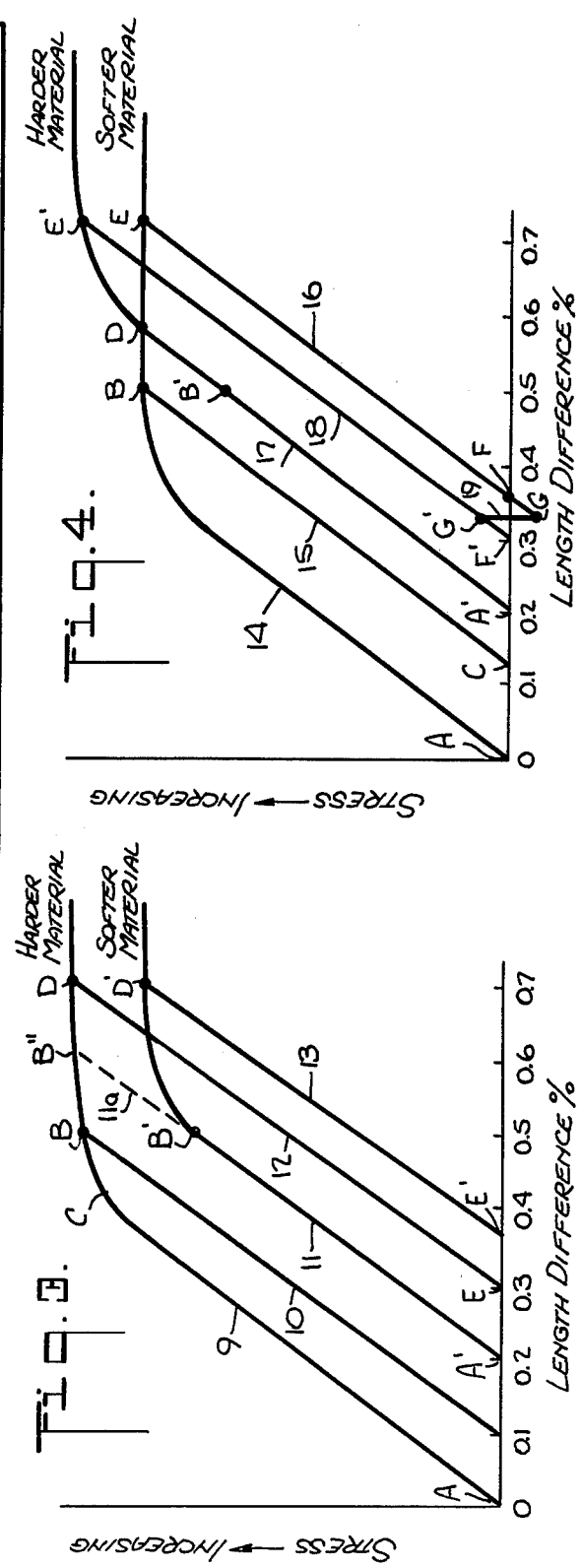

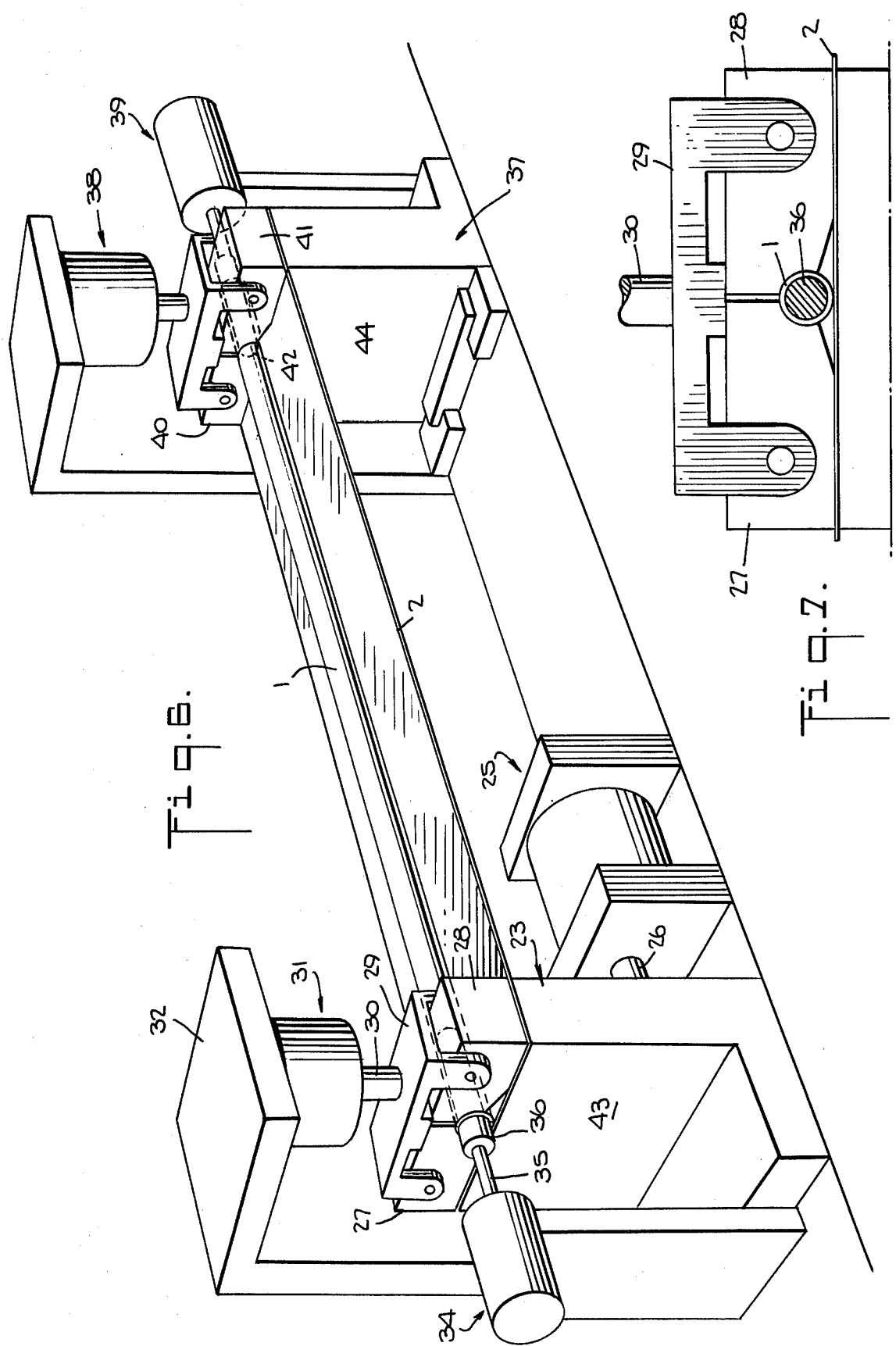

HEAT EXCHANGER PANELS AND METHOD OF MANUFACTURE

This invention relates to heat exchanger panels of the type sometimes known as solar panels and which comprise heat absorbing metal sheets having tubing for conveying fluid secured thereto by metal which has been heated and cooled and to a method of manufacturing such panels.

Panels of the type to which the invention relates and the manufacture thereof as illustrated and described in U.S. Pat. No. 4,136,272. In general, panels of such type have metal tubing secured to relatively thin metal sheets or strips by good heat transfer means, such as solder, brazing metal or weld metal. U.S. Pat. No. 4,136,272 describes the use of high frequency welding techniques for joining the tubing and the metal sheet.

The width of the sheet usually is several times the diameter of the tubing. Heat is applied to the tubing and the sheet at their adjacent faces as they are joined together, and when high frequency welding is employed to join them, the temperature is relatively high at such faces. It has been found that while the temperature at such faces is relatively high in the various joining methods, the temperature of the sheets only a short distance from the tubing is much lower and that after tubing and sheet are joined together and cooled, the shrinkage of the heated metal where the tube and the sheet are joined is such that ripples or buckling occurs in the sheet outwardly of the tubing. Such buckling is random and not only causes the sheet to have an undesirable appearance but also causes gaps between the edges of adjacent sheets when several panels are placed side-by-side as illustrated in U.S. Pat. No. 4,136,272, such gaps also being undesirable from the standpoint of appearance. In addition, the shrinkage may cause the panel to bend transversely to the axis of the tubing which makes it necessary to straighten the tubing before it can be assembled with headers in the manner illustrated in said patent.

Experiments have shown that the shrinkage at the heated area is relatively small even though the buckling effect is quite noticeable. For example, when copper tubing about 3/8 in. outside diameter is welded to copper sheet about four inches wide and 0.010 inches thick using high frequency welding of the type described in said patent, the weld area shrinks about 0.020 inches per foot as compared to the outboard edges of the sheet. Similar copper tubing welded to aluminum sheet of similar dimensions in the same way shrinks about 0.015 inches per linear foot. Thus, the relative shrinkage is in the range of from 0.125% to 0.16%.

In the co-pending application of Wallace C. Rudd entitled "Heat Exchanger Panels and Method of Manufacture," Ser. No 113,790 filed Jan. 21, 1980 and assigned to the assignee of this application, it is proposed that the undesirable appearance of the sheet material be improved by corrugating the sheet material. While such corrugation of the sheet material is effective, users of the panels may, in some cases, prefer panels without corrugations. In addition, tubing is usually straightened by an additional step prior to and/or after the corrugating step. Such straightening of the tubing usually is satisfactory, but in some cases, the straightening may not be adequate or the panel may become bent transversely to the axis of the tubing, or around such axis during or after the corrugation of the sheet material.

One object of the invention is to improve the appearance of heat exchanger panels in a simple and inexpensive manner without adversely affecting the heat exchange properties thereof and without the need for corrugating the sheet material.

In accordance with the preferred embodiment of the invention, a heat exchanger element, comprising a metal tube joined to metal strip or sheet material by a method involving the use of heat, is subjected to a stretching operation which stretches the tube and the metal joining the tube to the sheet material by an amount sufficient to cause it to have the substantially same length as the outboard edges of the sheet material. Ideally, only the tube is stretched if the properties of the tube and the sheet material are such that the tube can be stretched beyond its elastic limit and so that its length after stretching is the same as the unstretched length of the sheet material. However, such properties may not be encountered, and the stretch and elastic properties of materials vary from batch to batch. Therefore, it may be necessary to stretch both the tube and the sheet material beyond their elastic limits to be certain of obtaining the desired results.

The method of the invention has the advantage that in addition to removing the undesirable wrinkles in the sheet material, the stretching causes the element to be straight, that is, the axis of the tube is substantially rectilinear after the stretching step.

Other objects and advantages of the present invention will be apparent from the following detailed description of the presently preferred embodiments thereof, which description should be considered in conjunction with the accompanying drawings in which:

FIG. 1 is diagrammatic, side elevation view illustrating the welding of tubing to a thin strip or sheet;

FIG. 2 is an isometric view of a short section of a tube welded to a strip as illustrated in FIg. 1 and prior to stretching of the tube-strip combination;

FIG. 3 and 4 are graphs illustrating the stretching of the tube and strip with stress longitudinally thereof;

FIG. 5 is a diagrammatic, side elevation view of apparatus which may be used to stretch the tube-strip combination;

FIG. 6 is an enlarged, perspective view of a portion of the apparatus shown in FIG. 5; and FIG. 7 is an end elevation view of a clamping portion of the apparatus shown in FIGS. 5 & 6.

The invention will be described in connection with metal tubing substantially continuously welded to a metal strip by the use of high frequency current supplied to the tube and strip in advance of a weld point by means of contacts engaging the tube and the strip in advance of the weld point, but it will be apparent to those skilled in the art that the invention is applicable to tube-strip combinations produced in other ways which involve the use of heated and cooled metal to join the tubing to the strip, such as, for example, joining the tubing to the strip by soldering, brazing, resistance welding, consumable electrode welding, etc., in which the faying surfaces of the tubing and the strip are heated to a higher temperature than portions of the strip spaced laterally of the tubing thereby causing the tubing and the weld metal to shrink in length with respect to the length of such portions of the strip.

The invention may be used in connection with heat exchange elements having various combinations of tube metal and strip metal. For example, the combinations may be as follows:

| TUBE | STRIP |
| --- | --- |
| copper | copper |
| copper | aluminum |
| copper | carbon steel |
| carbon steel | carbon steel |
| carbon steel | copper |
| stainless steel | stainless steel |
| stainless steel | steel |
| aluminum | aluminum |

FIG. 1 illustrates diagrammatically and in side elevation the welding of a tube 1 to a strip or sheet 2 by supplying high frequency, electric current, e.g. having a frequency of at least 50 Khz and preferably, between 400 Khz and 500 Khz, to a pair of contacts 3 and 4, the contact 3 engaging the tube 1 and the contact 4 engaging the strip 2. The tube 1 and the strip 2 are advanced longitudinally in the direction of the arrow 5 and are pressed together at a weld point W by a pair of rollers 6 and 7, the roller 6 having a peripheral groove which permits the roller 6 to partially embrace the tube 1. Current flows on the facing surfaces of the tube 1 and the strip 2, due to the proximity effect, to and from the contacts 3 and 4. The principal path of the current on the surface of the strip 2 is narrow relative to the width of the surface due to the proximity effect between current flowing the tube 1 and the current at the surface of the strip 2. The tube 1 and the strip 2 approach each other in advance of the weld point W along paths providing a V-shaped gap in advance of the weld point W, and in their passage from the contacts 3 and 4 to the weld point W, the tube 1 and the strip 2 reach welding temperature at their faying surfaces, due to the current flow therein, by the time that they reach the weld point W. After the tube 1 and the strip 2 leave the nip of the rollers 6 and 7, they cool, or are cooled by a cooling fluid, and the tube 1 and the strip 2 have a substantially continuous weld therebetween which is formed by heated and cooled metal of the tube 1 and the strip 2.

As indicated in FIG. 2, the strip 2 is wide relative to the largest cross-section dimension of the tube 1, and the tube 1 preferably has a cross-section in the shape of an inverted tear drop so as to aid in concentrating the current along narrow paths in both the tube 1 and the strip 2. The tube 1 may, for example, have a diameter of $\frac{3}{8}$ to $\frac{1}{2}$ inch prior to shaping, and the strip 2 may have a width of four to eight inches and a thickness in the range of 0.010 to 0.020 inches. Of course, the tube 1 and strip 2 may have other dimensions, but the strip 2 will normally have a width several times, e.g. at least ten times, the largest cross-sectional dimension of the tube 1 and many times the thickness of the strip 2.

The tube 1 and the strip 2 will be heated rapidly at their faying surfaces to a relatively high, welding temperature whereas portions of the strip 2 outwardly from, that is in directions extending away from, the tube 1 will not be heated to the forge welding temperature. As a result, the tube 1, the strip 2 and the weld metal therebetween shrink in length after cooling where the weld is formed and with respect to the portions of the strip 2 spaced outwardly from the weld. As mentioned hereinbefore the shrinkage may be in the range from 0.125% to 0.16%. Such shrinkage of the tube 1, the strip 2 and the weld metal causes buckling of the strip 2 outwardly of the tube 1 and causes the formation of random ripples 8 in portions of the strip 2 outwardly of the tube 1. Such buckling and the formation of ripples 8 has been found to be commercially undesirable for the reasons set forth hereinbefore.

It has been found from tests that under certain conditions the ripples 8 can be removed by stretching only the tube 1 and its immediate adjacent metal beyond their elastic limits without stretching the portions of the strip 2 outwardly of the tube 1 and containing the ripples 8. However, for reasons explained hereinafter, it usually is necessary to stretch both the tube 1 and the strip 2. In any case, neither the tube 1 nor the strip is stretched to the point where it fractures or tears, and preferably, the length of the shorter of the two is stretched by not more than 2.25%.

A further advantage of stretching the tube 1 is that after stretching, the tube 1 is substantially rectilinear. Similarly, when the strip 2 is stretched, the outboard edges thereof are substantially rectilinear after stretching.

FIGS. 3 and 4 are modified stress-strain diagrams of a conventional type and indicate the effects of stretching metal. Generally speaking, the metal of the tube 1 will have a hardness different from the hardness of the metal of the strip 2, and such relationship will be assumed for purposes of illustration. It will also be assumed for purposes of illustration that after the tube 1 has been joined to the strip 2 and prior to the stretching thereof, the length of a tube 1 on a panel element is 0.2% less than the length of the outboard edges of the strip 2 of the panel element.

Graph line 9 in FIG. 3 is representative of the increase in length of a tube 1 of harder metal with the stress applied longitudinally thereof. Thus, within its elastic limit, say up to the point C on line 9, the length of the tube 1 will increase linearly with stress, and if the stress is then discontinued, the tube 1 will return to its original length along the line 9. When the stress exceeds the value at point C, the elastic limit is exceeded, and the tube 1 will not return to its original length after the stress is discontinued. Assume that the stress on the tube 1 is increased to point B. When the stress is discontinued, the tube will shorten along the line 10 and the length of the tube 1 will be only 0.1% longer than it was before stretching. Bearing in mind that the tube 1 originally was 0.2% shorter than the strip 2, this means that if the strip 2 was not stretched beyond its elastic limit at the same time, then, the tube 1 will still be 0.1% shorter than the strip 2.

If the characteristics of the strip 2 were the same as the characteristics of the tube 1, the strip 2 would not be stretched beyond its elastic limit when the stress is increased to an amount which will elongate the strip 2 by about 0.4%. Thus, if the tube 1 is stretched by 0.6% to point B″, it would shorten along line 11 and its dotted line extension 11a. Thus, after stretching, the tube 1 would be 0.2% longer. However, the strip 2 would not be stretched beyond its elastic limit (0.4% or 0.6% minus 0.2%), and after stretching, the tube 1 and the strip 2 would have the same length. In this way, the ripples 8 would be eliminated.

However, the characteristics of metals vary from batch to batch and with the working thereof to form tubes, sheets, strips, etc. If the characteristics of the tube 1 are represented by the line 9 and the same characteristics of the strip 2 are represented by the solid line 11, then, stretching cannot be used to remove the ripples 8. Thus, if the strip 2 is not stretched beyond its elastic limit (point B′) and the tube 1 is stretched beyond its elastic limit (point B), the tube 1 will still be shorter than the strip 2 (by 0.1%), and while the buckling and ripples 8 will be less, the ripples 8 will not be substantially eliminated.

If the stress is increased so that both the tube 1 and the strip 2 are stretched beyond their elastic limits, say to points D and D', then, the tube 1 will shorten along line 12 and the strip 2 will shorten along line 13 with the result that the strip 2 is still longer than the tube 1 by about 0.075%. While this is an improvement, the ripples 8 are still not substantially removed.

Therefore, it is preferred that the characteristics of the tube 1 and the strip 2 be as illustrated in FIG. 4, the lines 14, 15 and 16 illustrating the characteristics of the metal of the tube 1 (softer metal) and the lines 17 and 18 illustrating the characteristics of the metal of the strip 2 (harder metal).

It will be observed from FIG. 4 that if the tube 1 is stretched to point B and the strip 2 is stretched to point B' (below elastic limit), the tube 1 will be shorter than the strip 2 when the stress is discontinued. When both the tube 1 and the strip 2 are stretched to point D, the tube 1 and the strip 2 will be the same length when the stress is discontinued. When the tube 1 is stretched to point E and the strip 2 is stretched to point E', the tube 1 will be longer than the strip 2 by about 0.05% when the stress is discontinued, provided that they were both free. However, since they are joined together and must be at the same length where they are joined, the tube 1 is under compression and the strip 2 is under tension so that the actual differences in length will be somewhat less, at least near the tube 1. The condition is illustrated by the line 19 joining the points G and G'. This condition is acceptable because the tube 1 is relatively strong and resistant to buckling, and tension on the strip 2 will substantially eliminate the ripples 8 which were present therein prior to stretching.

For these reasons, in the preferred embodiment of the invention, the metal of the strip 2 has an elastic limit higher than the elastic limit of the metal of the tube 1, or in other words, the metal of the tube 1 is softer than the metal of the strip 2. Also, the tube 1 is stretched beyond its elastic limit, and preferably, there is slight stretching of the strip 2 beyond its elastic limit. However, neither is stretched more than by about 2.25%.

FIGS. 5–7 illustrate diagrammatically one form of apparatus which may be used to perform the stretching of a panel element in accordance with the invention. In the apparatus shown in FIGS. 5–7, a rigid base 20 supports a sub-base 21 and rails 22 which are secured to the base 20. The tub-base 21 supports a first clamping stand 23 which is slidably mounted thereon. The stand 23 is movable in the directions indicated by the double-ended arrow 24 by a fluid operable piston and cylinder assembly 25, the cylinder being secured in a fixed position on the sub-base 21 and the rod 26 of the piston being secured to the stand 23. The stand 23 also carries a pair of clamping blocks 27 and 28 hingedly mounted on a member 29 carried by a piston rod 30 of a fluid operable piston and cylinder assembly 31. The assembly 31 is secured to a stand extension 32, and when fluid under pressure is supplied to the assembly 31, the rod 30 moves the blocks 27 and 28 into engagement with the end portions of the tube 1 and the strip 2 to prevent movement thereof with respect to the stand 23 during the stretching operation.

A further extension 33 of the stand 23 has a further fluid operable piston and cylinder assembly 34 secured thereto. The piston rod 35 of the assembly 34 carries a plug 36 which, when fluid under pressure is supplied to the assembly 34, is pushed into the end of the tube 1 to aid in preventing the collapse of the end of the tube 1 under the pressure of the blocks 27 and 28. However, if the tube 1 is sufficiently rigid, the assembly 34 and the plug 36 may be omitted.

A second clamping stand 37, similar to the clamping stand 23, is adjustably mounted on the rails 22. The stand 37 may be secured to the rails 22 at various fixed positions thereon to permit the apparatus to be used with panel elements of different lengths. The stand 37 carried fluid operable piston and cylinder assemblies 38 and 39, corresponding respectively to the assemblies 31 and 34, clamping blocks 40 and 41, corresponding to the blocks 27 and 28, a plug 42, etc.

In operation, the piston rod 26 is retracted, moving the stand 23 to the right as viewed in FIGS. 5 and 6. The stand 37 is adjusted on the rails 22 until it is at the spacing from the stand 27 which is correct for receiving the panel element, which comprises the tube 1 joined to the strip 2. With the blocks 27, 28, 40 and 41 raised above the pedestals 43 and 44 by an amount sufficient to receive the end portions of the panel elements and with the plugs 36 and 42 retracted, the end portions of the panel element are inserted between the blocks 27 and 28 and the blocks 40 and 41 respectively. The assemblies 31 and 38 are operated, to clamp one end portion of the tube 1 and the strip 2 between the blocks 27 and 28 and the surface of the pedestal 43 and the other end portion of the tube 1 and the strip 2 between the blocks 40 and 41 and the surface of the pedestal 44, and the assemblies 34 and 39 are then operated to insert the plugs 36 and 42 into the ends of the tube 1. After the end portions of the tube 1 and the strip 2 are tightly clamped in the stands 23 and 37, the assembly 25 is operated to move the stand 23 to the left, as viewed in FIGS. 5 and 6, thereby to stretch the tube 1 and the strip 2 and to cause removal of the ripples 8 and straightening (if required) of the tube 1 and the strip 2.

After the tube 1 and the strip 2 have been stretched to the desired extent, the fluid pressure in the assembly 25 is reduced to permit the tube 1 and the strip 2 to contract, and blocks 27, 28, 40 and 41 are raised as the plugs 36 and 42 are pulled out of the ends of the tube 1. The panel element is then removed and is ready for further processing such as the removal or bending away of short sections of the strip 2 adjacent to the ends of the tube 1 so as to leave tube end portions extending from the strip ends.

In appearance, the stretched panel element will have a substantially rectilinear tube 1 with metal of the strip 2 at each side thereof substantially free of ripples and lying substantially in a flat plane, the outboard edges of the strip 2 also being substantially rectilinear. The stretching of the tube 1 and the strip 2 will be less than 2.5% and preferably is from 0.5 to 1%. It may be possible to determine that the tube 1 and the strip 2 have been stretched by an examination of the grain structure thereof, but it is not possible, at least at this time, to determine the amount that they have been stretched by a mere physical examination thereof.

Although preferred embodiments of the present inventions have been described and illustrated, it will be apparent to those skilled in the art that various modifications may be made without departing from the principles of the invention. For example, the invention is applicable to the various panel elements in which the tube-strip combination is formed in other ways, such as is disclosed in FIGS. 18–27 of the co-pending application of Wallace C. Rudd, Ser. No. 113,790, filed Jan. 21, 1980 and entitled "Heat Exchanger Panels and Method of Manufacture".

What is claimed is:

1. A method of manufacturing a heat exchanger element which comprises:

joining a metal tube to a metal sheet by means of heated metal and thereafter cooling said metal, said sheet being wide relative to the cross-sectional dimension of said tube and being thin relative to its width and the axis of said tube extending in the length direction of said sheet, said tube being joined to said sheet intermediate its width by said heated metal substantially continuously along the length of said tube, whereby upon cooling, said tube and said heated and cooled metal have a length shorter than the outboard edges of said sheet and buckling of said sheet occurs; and thereafter, mechanically stretching at least said tube along its axis and beyond the elastic limit of the metal thereof and by an amount sufficient to cause its length to be substantially equal to the length of the outboard edges of said sheet and to substantially eliminate ripples in said sheet caused by buckling thereof when the stretching is discontinued.

2. Method as set forth in claim 2 wherein the metal of said sheet is also stretched beyond the elastic limit thereof.

3. Method as set forth in claim 1 or 2 wherein the stretching is not greater than 2.5%.

4. Method as set forth in claim 3 wherein the stretching is in the range from about 0.5% to about 1.0%.

5. Method as set forth in claim 3 wherein the tube is joined to said sheet by high frequency welding which comprises advancing said tube and said sheet in spaced apart relation to a weld point, suppling high frequency current to said tube and said sheet in advance of said weld point and pressing said tube and said sheet together at said weld point.

* * * * *